Feb. 17, 1925.    F. E. WILLIAMS    1,526,405
DISTRIBUTOR
Filed April 26, 1924

Inventor:
Frank E. Williams,
By Hugh K. Wagner
Attorney.

Patented Feb. 17, 1925.

1,526,405

UNITED STATES PATENT OFFICE.

FRANK E. WILLIAMS, OF ST. LOUIS, MISSOURI.

DISTRIBUTOR.

Application filed April 26, 1924. Serial No. 709,296.

*To all whom it may concern:*

Be it known that I, FRANK E. WILLIAMS, a citizen of the United States, residing at the city of St. Louis, State of Missouri, have invented certain new and useful Improvements in Distributors, of which the following is a specification.

This invention relates to a method and apparatus for counting articles and distributing them into a predetermined order or arrangement. For purposes of illustration, but not for purposes of exhaustive enumeration, one form of this distributor, adapted to place a predetermined number of pellets in the several recesses of a block, is described herein.

In the accompanying drawings forming part of this specification, in which like numbers of reference denote like parts wherever they occur, Figure 1 is a plan view of the distributor, showing it applied to a recessed block for the purpose of depositing the adhering pellets into the several recesses of the block, the handle being in section on the line 1—1 of Figure 2;

Figure 1:
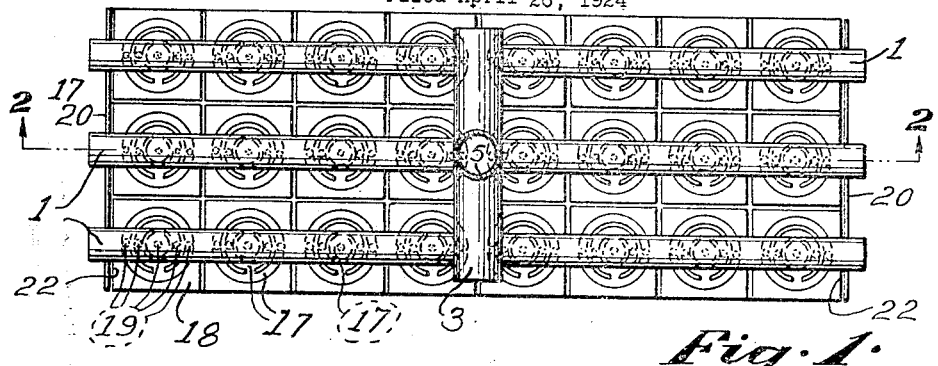

The distributor comprises a plurality of parallel tubes 1, having their ends closed by end walls 2, and connected together intermediately of their lengths by a transverse tube 3, having closed ends or walls 4. A tube 5, which, also, serves as a convenient handle for holding the distributor, projects upwardly from the tube 3 midway of its length, and has secured thereto by threads 6 valve chamber 7. Valve chamber 7 contains valve 8, normally retained in open position by a compression spring 9, interposed between valve seat 10 and the inner terminus 11 of valve recess 12. Valve 8 is limited in its outward movement by shoulder 13, and can be removed from the chamber, together with spring 9, by unscrewing plug 14. A hose or other flexible tube 15 leading from any suitable vacuum producer may be connected to the outer end of tube 5.

Figure 2:
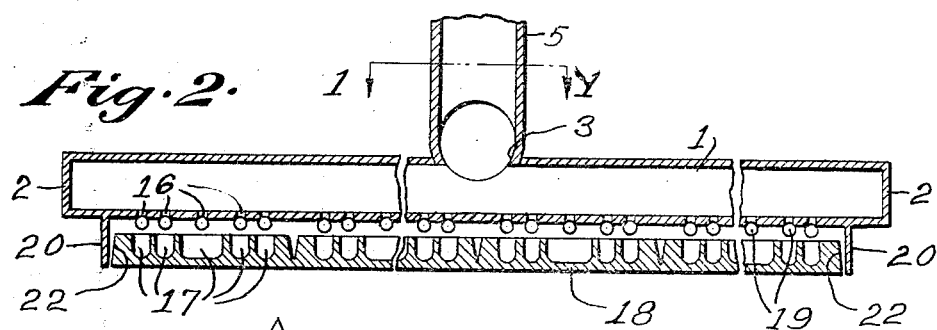
Figure 2 is a sectional view on the line 2—2 of Figure 1.
Figure 3:
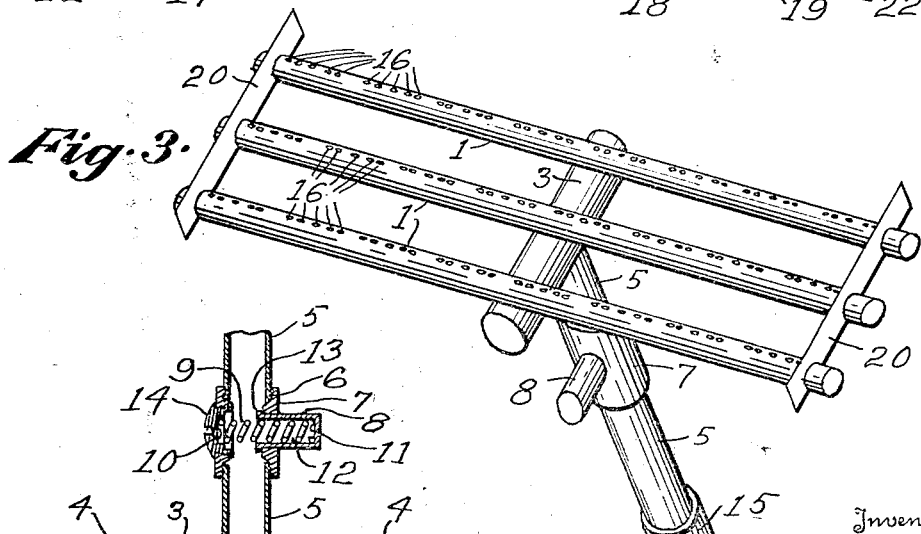
Figure 3 is a perspective view of the distributor, with its underside facing the observer.

The underside of the tubes 1 contain apertures 16, spaced to register with the recesses 17 of the recessed block 18, into each of which recesses preferably one of the pellets 19 is to be deposited, as best shown in Figures 1 and 2. To locate the distributor accurately with reference to the block 18, locating stops in the form of strips 20 are affixed to the undersides of the tubes 1 near each of their ends, preferably by soldering or otherwise, so as to form connecting bridges across the several tubes 1.

Figure 4:
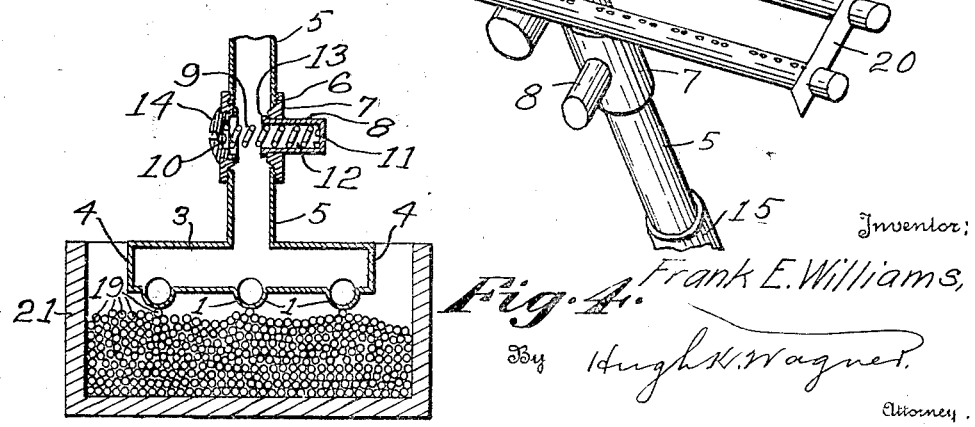
Figure 4 is a transverse vertical central sectional view, depicting the distributor as presented to a box of pellets for receiving a supply of the latter.

In using the apparatus, the distributor is placed in a box 21 containing a supply of the pellets 19, as best shown in Figure 4, whereupon, the valve 8 being open, the vacuum suction is communicated through hose 15, handle 5, tube 3, and tubes 1 to the apertures 16, each of which attracts or draws to itself, by reason of such suction, one of the pellets 19, which are slightly larger than the apertures 16, and so become seated thereon. The distributor is now brought over the block 18, its proper position being readily determined by placing the locating strips 20 one on each side 22 of the block 18, when the pellets borne by the tubes 1 will be brought directly over the respective recesses 17 into which they properly belong. Valve 8 is now pressed inward, thereby cutting off the suction, and allowing the pellets to drop into the recesses 17.

The distributor need not necessarily be of the tubular form, nor need the apertures be arranged as shown herein, but it may be modified to adapt it to various conditions of use.

Having thus described this invention, I hereby reserve the benefit of all changes in form, arrangement, order, or use of parts, as it is evident that many minor changes may be made therein without departing from the spirit of this invention or the scope of the following claims.

I claim:

1. In a distributor, the combination of a plurality of tubes, and locating strips connecting the same.

2. In a distributor, the combination of a plurality of tubes, locating strips adjacent either end and an intermediate tube connecting the same, and a hollow handle communicating with the said intermediate tube.

3. In a distributor, the combination of a plurality of tubes, locating strips adjacent either end and an intermediate tube connecting the same, a hollow handle communicating with the said intermediate tube, and a valve on the said handle.

4. In a distributor, a plurality of vacuum-suction tubes, locating strips connecting said tubes, a main tube connecting the vacuum-suction tubes and means controlling the flow of fluid through the main tube.

5. In a distributor, a plurality of vacuum-suction tubes, locating strips connecting said tubes, a main tube connecting the vacuum-suction tubes, a hollow handle communicating with said main tube and forming an extension thereof, and a valve controlling the flow of fluid through said hollow handle.

In testimony whereof I hereunto affix my signature.

FRANK E. WILLIAMS.